T. GRASER.
Manufacture of Wagon-Axles.

No. 209,883.  Patented Nov. 12, 1878.

Witnesses:  Inventor:

UNITED STATES PATENT OFFICE.

THEODOR GRASER, OF OSWEGO, NEW YORK.

IMPROVEMENT IN THE MANUFACTURE OF WAGON-AXLES.

Specification forming part of Letters Patent No. 209,883, dated November 12, 1878; application filed August 30, 1878.

*To all whom it may concern:*

Be it known that I, THEODOR GRASER, of the city of Oswego, in the State of New York, have invented new and useful Improvements in the Manufacture of Wagon-Axles, of which the following, taken in connection with the accompanying drawing, is a full, clear, and exact description.

This invention relates to the construction of hollow axles and their spindles; and consists in the peculiar method of such construction, hereinafter described, and more particularly pointed out in the claims.

Figure 1:
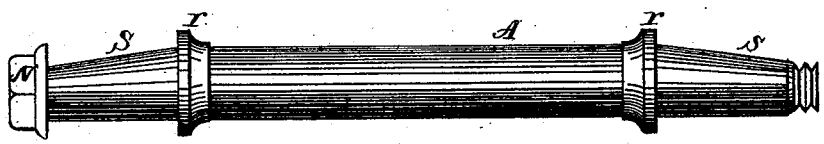
Figure 2:
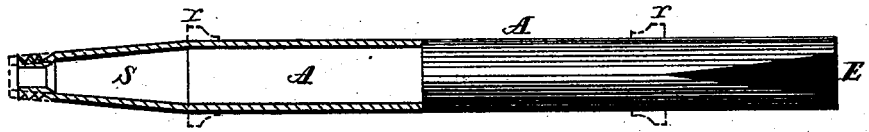

Figure 1 of the drawings represents, in elevation, an axle constructed according to my method; and Fig. 2 represents one partly in longitudinal section, with the cleft which allows the tapering spindle to be formed thereon.

A designates an axle, having on its ends the usual tapering spindles S. This axle, with its spindles, I form of one piece of metal tubing. In the top of this I make an inward tapering excision, E, at each end, extending inward the length of the spindle, and having its outer end equal in width to the difference between the circumference of the inner end and the circumference of the outer end of the spindle. The purpose of this excision is to produce the peculiar taper shape of an axle-spindle. By means of a swage of the requisite taper I join the edges of the excision and weld them together. Then, by a swage of smaller inner periphery, I further compress and simultaneously upset the small end of the spindle, and thereby increase the thickness of the metal thereat, so as to admit of cutting a thread thereon for the reception of the nut N, which retains the wheel on the axle. At the inner or large end of the spindle I form the requisite shoulder for the rear of the wheel-hub by welding or shrinking on the axle the collar $r$, in the usual manner.

Having described my invention, what I claim is—

1. The within-described mode of forming from one tube a seamless hollow axle with tapering spindles, by making on top of the ends of the tube the V-shaped excision E, and joining the edges of said excision by a swage of the requisite taper, substantially as specified.

2. The within-described mode of forming from one tube a seamless hollow axle having tapering spindles with screw-threads on their end, by making on top of the ends of the tube the V-shaped excision E, then joining the edges of said excision by a swage of the requisite taper, and further compressing and upsetting the end by a swage of smaller circumference, substantially as set forth.

In testimony whereof I have hereunto set my hand this 14th day of August, 1878.

THEODOR GRASER.

Witnesses:
R. E. STONE,
C. BENDIXEN.